(12) United States Patent
Matsui

(10) Patent No.: US 8,854,352 B2
(45) Date of Patent: Oct. 7, 2014

(54) IMAGE DISPLAY DEVICE

(75) Inventor: Tomomi Matsui, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 239 days.

(21) Appl. No.: 13/601,654

(22) Filed: Aug. 31, 2012

(65) Prior Publication Data

US 2013/0201170 A1  Aug. 8, 2013

(30) Foreign Application Priority Data

Feb. 3, 2012  (JP) ................................. 2012-021628

(51) Int. Cl.
*G06F 3/038* (2013.01)

(52) U.S. Cl.
USPC ........................................ 345/211; 345/204

(58) Field of Classification Search
CPC . G09G 5/00; G09G 2330/00; G09G 2330/04; H04N 5/64
USPC ................................................ 345/204, 211
See application file for complete search history.

(56) References Cited

U.S. PATENT DOCUMENTS

| | | | |
|---|---|---|---|
| 2003/0213884 A1* | 11/2003 | Ikunami ................... | 248/346.01 |
| 2005/0045077 A1* | 3/2005 | Bober .......................... | 108/147 |
| 2007/0152114 A1* | 7/2007 | Choi ........................... | 248/168 |
| 2008/0294298 A1* | 11/2008 | Park .............................. | 700/302 |
| 2009/0168310 A1* | 7/2009 | Takao ...................... | 361/679.01 |
| 2009/0267762 A1* | 10/2009 | Shyu et al. .................... | 340/540 |
| 2010/0167791 A1* | 7/2010 | Lim ............................. | 455/566 |
| 2010/0226683 A1* | 9/2010 | Yamaguchi ................... | 399/110 |
| 2010/0328622 A1* | 12/2010 | Watanabe et al. ............... | 353/77 |
| 2011/0137198 A1* | 6/2011 | Hamaguchi et al. .......... | 600/547 |
| 2011/0187944 A1* | 8/2011 | Matsui ......................... | 348/789 |
| 2012/0127423 A1* | 5/2012 | Blum et al. .................. | 351/158 |
| 2012/0157073 A1* | 6/2012 | Kim et al. .................... | 455/418 |
| 2012/0229008 A1* | 9/2012 | Yamanaka .................... | 312/245 |

FOREIGN PATENT DOCUMENTS

| | | |
|---|---|---|
| JP | 2000-287146 A | 10/2000 |
| JP | 2007-214751 A | 8/2007 |
| JP | 2009-109650 A | 5/2009 |

* cited by examiner

*Primary Examiner* — Joe H Cheng
(74) *Attorney, Agent, or Firm* — Birch, Stewart, Kolasch & Birch, LLP

(57) ABSTRACT

An image display device is provided with a cover that covers a drive circuit unit and an optical unit and a falling-down detecting unit that detects the falling-down of the image display device. The falling-down detecting unit further detects, based on force to be applied to the falling-down detecting unit in a state in which the cover is attached to the image display device, whether or not the cover is detached from the image display device.

8 Claims, 6 Drawing Sheets

F I G. 2
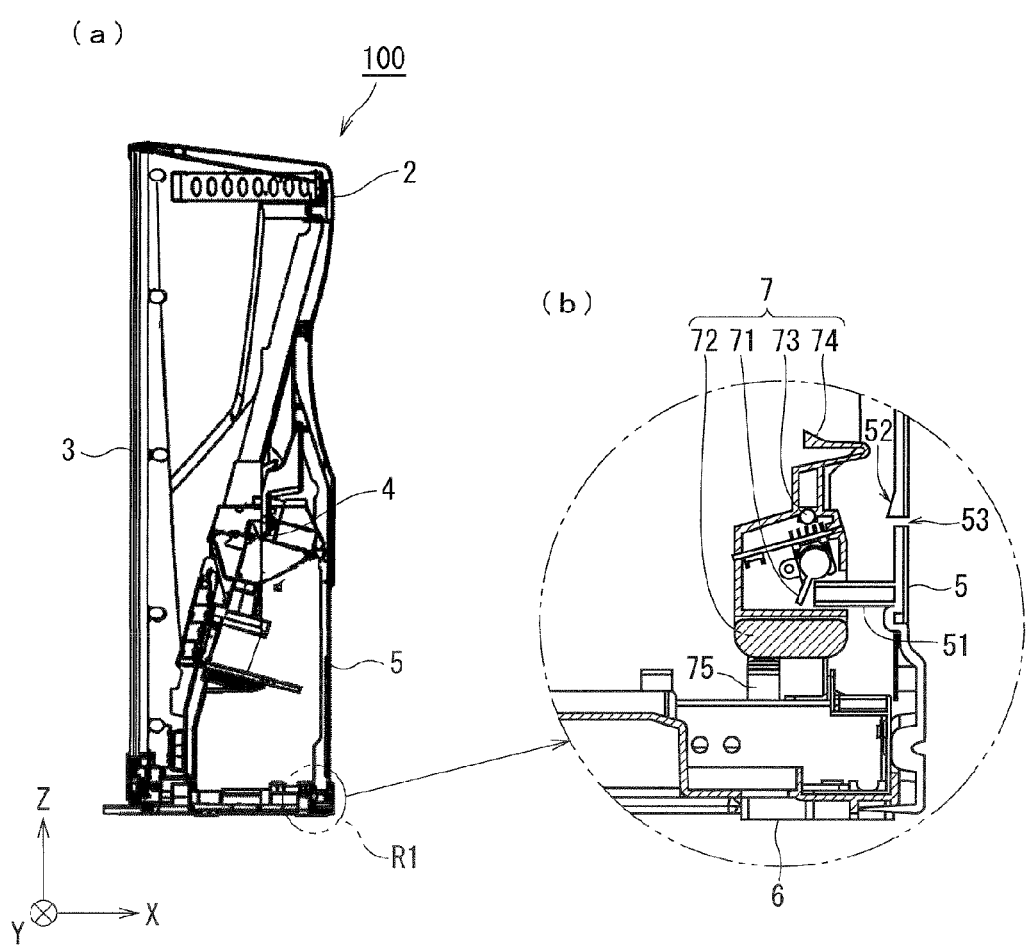

IMAGE DISPLAY DEVICE

BACKGROUND OF THE INVENTION

1. Field of the Invention

The present invention relates to an image display device having a large screen.

2. Description of the Background Art

Examples of an image display device include a flat-panel television mounting a plasma display panel or a liquid crystal panel thereon, a rear transmission projection television, and the like. The rear transmission projection television projects an image on a screen disposed at the front surface of a main body in enlargement from an optical engine. As the optical engine is used a light source such as a high-pressure mercury-vapor lamp or a semiconductor laser housed inside of the optical engine.

On the back side of the image display device is disposed a light emitting unit for a high pressure current-carrying circuit or a high output semiconductor laser. Therefore, the back side of the image display device is covered with a back cover. An image display device may be configured such that the back cover is provided with an opening/closing detecting switch so as to prevent a service person from getting an electric shock or directly receiving a laser light beam when the service person opens the back cover for repair. Specifically, the image display device provided with the opening/closing detecting switch is configured to actuate the opening/closing detecting switch when the back cover is opened so as to cut off power supply to a drive circuit.

The size of a screen in the image display device has been increased in recent years. A display device having a size of 80 inch or more has been commercially available. The weight of the image display device has been increased with the increasing site of the screen, and therefore, the center of gravity has become relatively higher.

As a consequence, the image display device is likely to fall down when it receives external force or an earthquake occurs. Should the image display device fall down, there arise the following problems: one of the problems is that when a user touches the broken image display device, he or she gets an electric shock; and another problem is that in the rear transmission projection television, when the front screen is broken or detached, a strong laser light beam leaks from inside to outside.

In view of the above, in order to prevent the image display device from falling down, an instruction manual instructs to fix the image display device onto a wall or to a television stand via a string or a metal fitting before use. However, in the case where the user installs the image display device without fixing it, an accident of falling-down of the image display device often occurs.

In order to secure safety at the time of the falling-down of the image display device in the above-described case, there are devised the following techniques: far example, Japanese Patent Application Laid-Open No. 2000-287146 discloses the technique for detecting an impact upon inclining or falling-down by a detecting switch disposed in an image display device and then cutting off a power source (hereinafter also referred to as Conventional Art A). Conventional Art A prevents a failure in an image display unit.

Alternatively, Japanese Patent Application Laid-Open No. 2009-109650 discloses the technique for detecting falling-down of an image display device that is automatically started to be operated upon receipt of an emergency alarm signal (hereinafter also referred to as Conventional Art B). According to Conventional Art B, a drive power source in a display unit is controlled not to be turned on in the case of detection of the falling-down of the image display device. Moreover, according to Conventional Art B, the falling-down is detected by utilizing the mechanical movement amount of a detection lot housed inside of a strut for supporting a bottom in the image display device.

Or, Japanese Patent Application Laid-Open No. 2007-214751 discloses an image display device (i.e., a television) provided with a sensor for detecting a positional variation and an acceleration in the image display device, a microcomputer for calculating an output signal from the sensor so as to determine whether as main body falls down or is moved, and a battery. The image display device (i.e., the television) utilizes the technique for switching a power source from a commercial power source to the battery in response to a command output from the microcomputer at the time of the falling-down of the image display device (hereinafter also referred to as Conventional Art C).

However, a detecting circuit (i.e., the sensor) disclosed in Conventional Arts A and B is adapted to detect only one state, that is, the inclination (i.e., the falling-down) of the image display device (i.e., the television). The sensor disclosed in Conventional Art C also detects only one state, that is, the acceleration of the image display device (i.e., the television).

In other words, according to Conventional Arts A, B, and C, another detecting circuit (i.e., another sensor) need be provided for detecting states other than the falling-down state of the image display device. The states other than the falling-down state include, for example, a state in which a cover covering a portion supplied with electric power is detached.

SUMMARY OF THE INVENTION

An object of the present invention is to provide an image display device capable of achieving detection of two kinds of states including detection of falling-down of the image display device at a low cost.

An image display device in one preferred embodiment according to the present invention includes: a cover that covers a predetermined driven unit to be driven by power supply; and a falling-down detecting unit that detects falling-down of the image display device. The falling-down detecting unit further detects, based on force to be applied to the falling-down detecting unit in a state in which the cover is attached to the image display device, whether or not the cover is detached from the image display device.

That is to say, the single falling-down detecting unit can detect both of the falling-down of the image display device and the detachment of the cover from the image display device. As a consequence, two detecting circuits or the like are not needed to detect the two kinds of states, and therefore, the falling-down detecting unit capable of achieving detection of the two kinds of states can be implemented at a low cost. In other words, the image display device capable of achieving detection of the two kinds of states can be implemented at a low cost.

According tea the present invention, the detection of the two kinds of states including the detection of the falling-down of the image display device can be achieved at a low cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a cross-sectional view showing the image display device, as viewed sideways;

DESCRIPTION OF THE PREFERRED EMBODIMENTS

Figure 1:
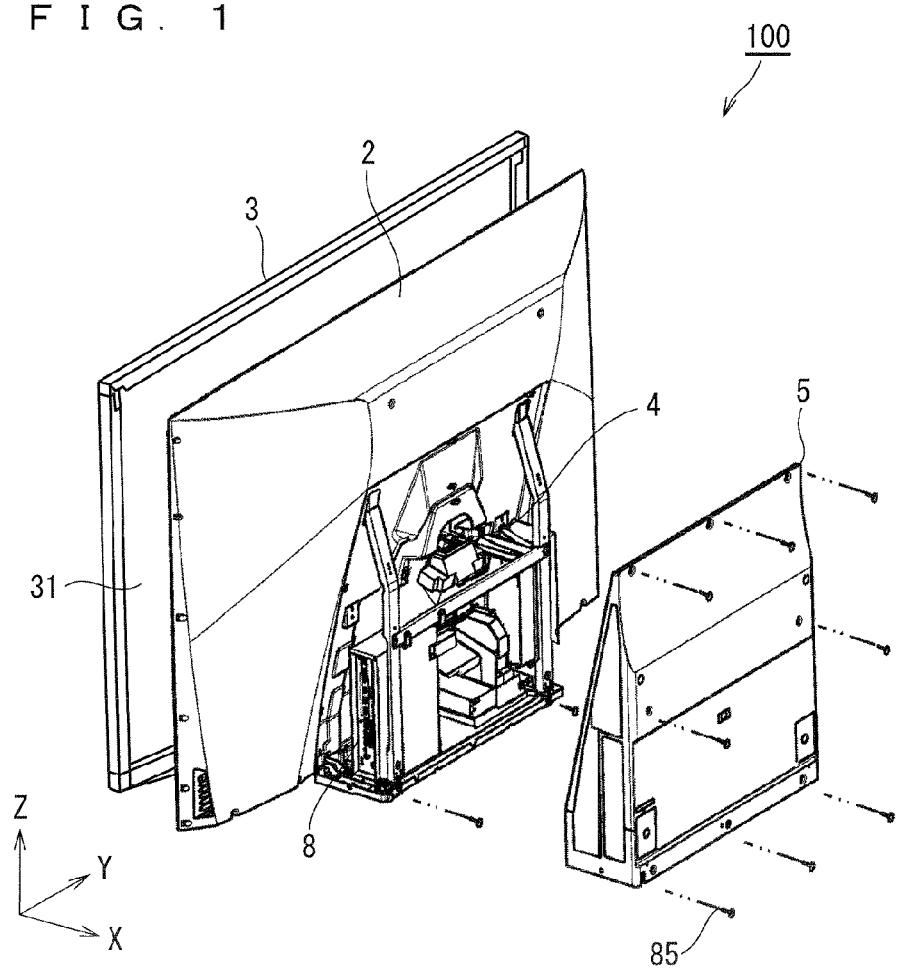
FIG. 1 is an exploded perspective view showing the external appearance of an image display device in a first preferred embodiment, as viewed from the back.

Preferred embodiments according to the present invention will be described below with reference to the drawings. In the following description, the same constituent elements are designated by the same reference numerals, and further, their names and functions are the same as each other. Therefore, the duplication of the detailed description may be omitted.

Here, the size, material, shape, and relative arrangement of the constituent elements illustrated in the preferred embodiments may be appropriately varied according to configurations of devices, to which the present invention is applied, or under various conditions, and therefore, the present invention is not limited to the preferred embodiments. Moreover, the dimension of each of the constituent elements in each of the drawings may be different from the actual dimension.

First Preferred Embodiment

FIG. 1 is an exploded perspective view showing, the external appearance of an image display device 100 in a first preferred embodiment, as viewed from the back. In FIG. 1, directions X, Y, and Z are perpendicular to each other. Moreover, directions X, Y, and Z in the following drawings are perpendicular to each other.

The image display device 100 is, for example, at rear transmission projection television having a thin and large screen. Incidentally, the image display device 100 is not limited to the rear transmission projection television, and therefore, may be other devices as long as there is a fear of falling-down. The image display device 100 may be exemplified by an image display device having a display such as a plasma display panel or a liquid crystal panel mounted thereon.

FIG. 2 is a cross-sectional view showing the image display device 100 as viewed sideways. Part (a) in FIG. 2 is a view showing the entire side of the image display device 100. As shown in part (a) in FIG. 2, a state in which the image display device 100 is normally installed with the bottom thereof located below also may be referred to as a normal installation state. Part (b) in FIG. 2 is an enlarged view showing a region R1 in part (a) in FIG. 2.

As shown in FIGS. 1 and 2, the image display device 100 is provided with a main case 2, a screen unit 3, an optical unit 4, a cover 5, a falling-down detecting unit 7, and a drive circuit unit 8.

The screen unit 3 includes a screen 31 fitted to a frame member. The screen 31 is adapted to display an image thereon. The screen 31 is, for example, a rear transmission screen. The screen unit 3 is combined with the main case 2.

The main case 2 contains therein the optical unit 4, the drive circuit unit 8, and other devices for displaying an image.

The optical unit 4 is designed to emit a light beam when it receives power supply from a power source unit (not shown). The optical unit 4 projects an image (i.e., a laser light beam) on the screen 31 by using a light source for emitting a light beam such as a semiconductor laser.

The drive circuit unit 8 is attached to the back of the main case 2. The drive circuit unit 8 is electrically driven by the power supply from the power source unit (not shown). The drive circuit unit 8 controls the optical unit 4. To the power source unit is supplied electric power from, for example, the outside of the image display device 100.

Here, the power source unit is adapted to supply the electric power also to the optical unit 4 and other parts to be driven by the electric power. Hereinafter, a part to be driven by the power supply is referred to as a power driven unit or a predetermined driven unit. For example, each of the optical unit 4 and the drive circuit unit 8 is the power driven unit. The power driven unit is to be driven by the electric power supplied from the power source unit (not shown).

The cover 5 is fixed to the main case 2 via screws 85 in such a manner as to be detachably attached to the main case 2 (i.e., the image display device 100). The cover 5 is provided so as to cover all the power driven units including the optical unit 4, the drive circuit unit 8, and the like in the image display device 100. When the cover 5 is fixed to the main case 2, the power driven units such as the optical unit 4, the drive circuit unit 8, and the like can be prevented from being touched from the outside.

The falling-down detecting unit 7 is disposed in a lower portion on the back of the image display device 100. Although the detailed description is given later, the falling-down detecting unit 7 detects the falling-down of the image display device 100 by utilizing at least gravity. Moreover, the falling-down detecting unit 7 detects whether or not the cover 5 is detached from the image display device 100 based on force to be applied to the falling-down detecting unit 7 when the cover 5 is attached to the image display device 100 (i.e., the main case 2).

Hereinafter, the state of the image display device 100 in which the cover 5 is detached from the image display device 100 may be referred to also as an uncovered state. Additionally, hereinafter, the state of the image display device 100 in which the cover 5 is attached to the image display device 100 may be referred to as a covered state.

Figure 3:
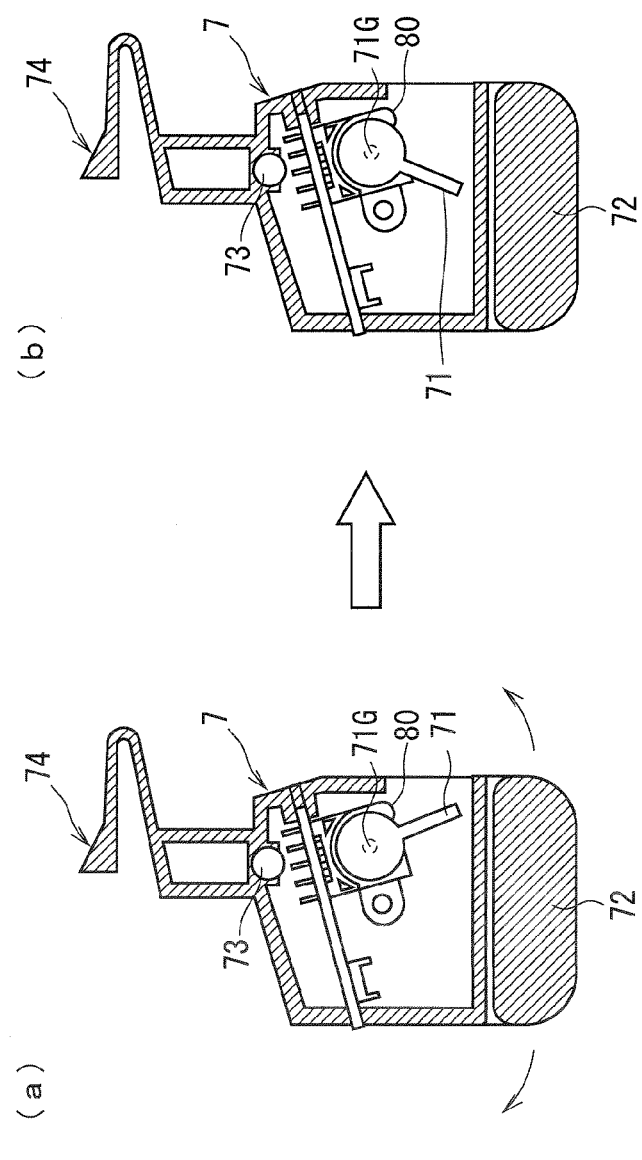
FIG. 3 is a cross-sectional view showing the configuration of a falling-down detecting unit.

FIG. 3 is a cross-sectional view showing the configuration of the falling-down detecting unit 7. Part (a) in FIG. 3 is a cross-sectional view showing the falling-down detecting unit 7 in the uncovered state. Part (b) in FIG. 3 is a cross-sectional view showing the falling-down detecting unit 7 in the covered state and the normal installation state.

Referring to part (a) in FIG. 3, the falling-down detecting unit 7 includes a lever 71, a weight 72, a hook 74, and a detecting circuit 80. The lever 71 is fixed to the falling-down detecting unit 7 in such a manner as to be freely turned on an axis 71G.

Part (b) in FIG. 3 shows a state in which the lever is turned with the application of pressure onto the lever 71.

The weight 72 is attached to the lower portion of the falling-down detecting unit 7. In other words, the weight 72 is attached to a part of the falling-down detecting unit 7.

The hook 74 has an elastic structure in which its tip is vertically moved when the pressure is applied to the upper portion thereof.

The detecting circuit 80 is adapted to detect the state of the lever 71 (such as a turn angle), although the detailed description is given later.

The falling-down detecting unit 7 is fixed to the image display device 100 via a shaft 73 in such a manner as to be freely the shaft 73. Specifically, the falling-down detecting unit 7 is fixed to the image display device 100 in such a manner as to make a pendulous motion, that is, inclination by the effect of the weight 72 according to the inclination of the image display device 100 when the image display device 100 falls down. The falling-down detecting unit 7 detects the falling-down of the image display device 100 based on the pendulous motion of the falling-down detecting unit 7, although the detailed description is given later.

Referring to part (b) in FIG. 2 again, the cover 5 has a projection 51 formed thereon.

The lever 71 is brought into contact with the projection 51 in the covered state and the normal installation state, and then, turns into the state shown in part (b) in FIG. 2 and part (b) in FIG. 3 under the pressure to be applied to the lever 71.

In contrast, the pressure is not applied to the lever 71 in the uncovered state, and therefore, the lever 71 turns into the state shown in part (a) in FIG. 3. Hereinafter, a state in which the pressure is not applied to the lever 71 may be referred to also as a lever pressure zero state. The turn angle of the lever 71 in the lever pressure zero state is zero.

The detecting circuit 80 detects the lever pressure zero state based on whether or not the turn angle of the lever 71 is zero. The detecting circuit 80 detects that the cover 5 is attached to the image display device 100 when the projection 51 and the lever 71 are brought into contact with each other whereas that the cover 5 is detached from the image display device 100 when the projection 51 and the lever 71 are brought out of contact with each other.

Upon the detection of the lever pressure zero state, the detecting circuit 80 controls the image display device 100 so as to stop the power supply to the power source (not shown), inside of the image display device 100. As a consequence, the power is stopped from being supplied to all of the power driven units including the drive circuit unit 8 and the optical unit 4. With this configuration, when a service person detaches the cover 5 from the image display device 100 for the purpose of repair, the power is stopped from being supplied to the power source unit and all of the power driven units including the drive circuit unit 8 and the optical unit 4 in the image display device 100 in the uncovered state.

Here, as shown in part (b) in FIG. 2, a bottom plate 6 is disposed at the bottom of the image display device 100. When the image display device 100 is placed on a floor or the like, the bottom plate 6 serves as a part of the image display device 100 in contact with the floor.

Furthermore, a stopper 75 is disposed at a lower portion of the image display device 100. As shown in part (b) in FIG. 2, the stopper 75 is brought into contact with the falling-down detecting unit 7 so as to fix the falling-down detecting unit 7 in the image display device 100 in the normal installation state. That is to say, the stopper 75 is disposed so as to prevent the falling-down detecting unit 7 from being moved caused by a slight vibration in the display device 100 in the normal installation state.

Additionally, as shown in part (b) in FIG. 2, the cover 5 includes a lock 52.

Next, a description will be given of the case where the image display device 100 falls down.

Figure 4:
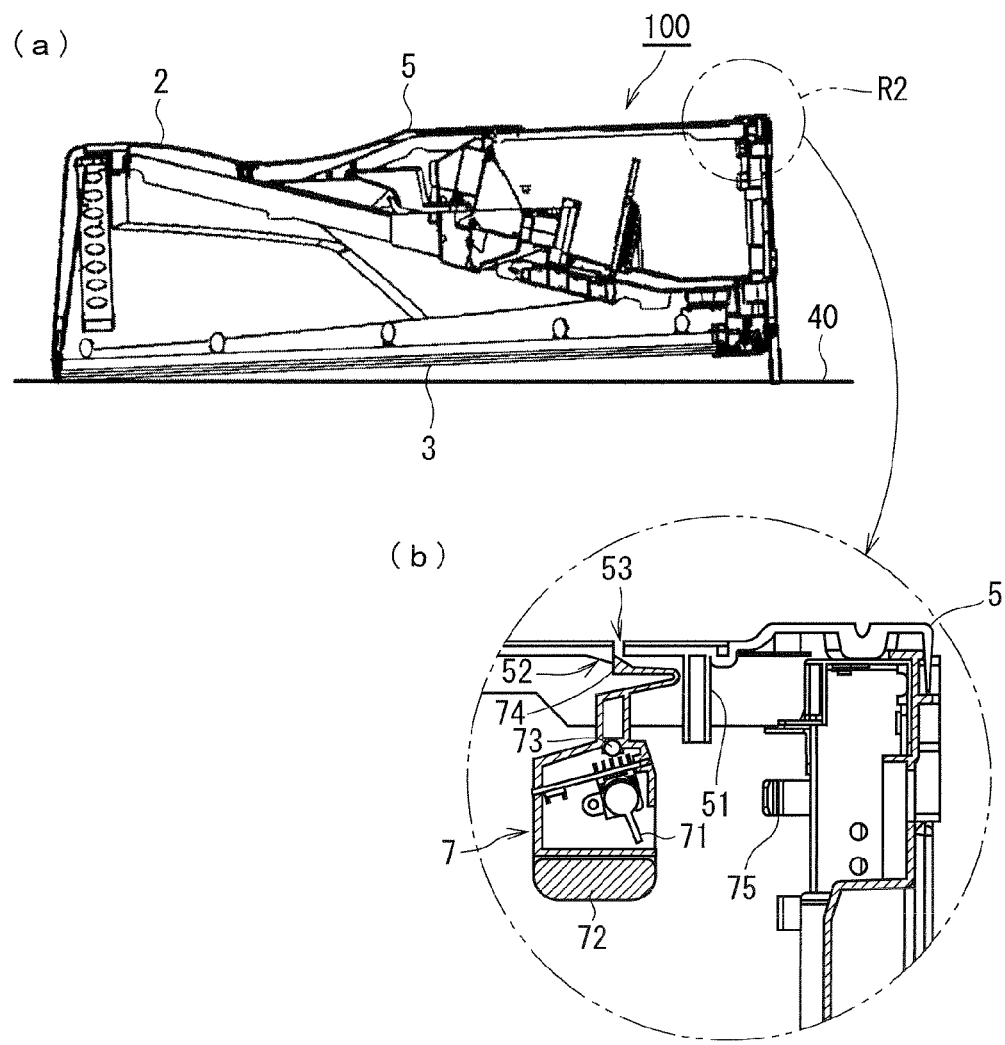
FIG. 4 is a cross-sectional view showing the image display device falling down forward with a screen unit thereof facing downward, as viewed sideways.

FIG. 4 is a cross-sectional view showing the image display device 100 falling down forward with the screen unit 3 thereof facing downward, as viewed sideways. The image display device 100 is assumed to fall down caused by, for example, an earthquake or the like. In this case, the screen unit 3 is assumed to be partly brought into contact with as floor 40.

Part (a) in FIG. 4 shows the entire side surface of the image display device 100. Part (b) in FIG. 4 is an enlarged view showing a region R2 shown art (a) in FIG. 4.

As the size of the screen of the image display device 100 is greater, a distance from the upper end of the image display device 100 to the floor 40 becomes greater when the image display device 100 falls down. The image display device 100 is normally mounted on a television stand or the like. Therefore, when the image display device 100 falls down, a larger shock exerts on the upper portion of the image display device 100. In this case, when the screen unit 3 is broken, the screen 31 is broken or detached, and therefore, a laser light beam leaks directly to the outside from the inside of the image display device 100.

In the case where the image display device 100 falls down forward, the falling-down detecting unit 7 makes the pendulous motion on the shaft 73 according to the inclination of the image display device 100 (i.e., the main case 2). When the image display device 100 falls down forward and the falling-down detecting unit 7 is turned at a predetermined angle (e.g., 10°) or more, the lever 71 is separated from the projection 51 of the cover 5. Specifically, the lever 71 is brought into contact with the projection 51 in the state in which the image display device 100 is normally installed whereas the lever 71 is brought out of contact with the projection 51 in the state in which the image display device 100 falls down.

When the lever 71 is separated from the projection 51, the detecting circuit 80 detects the lever pressure zero state, and thus, controls to stop the power supply to the power source unit (not shown), inside of the image display device 100.

In this manner, the power supply to all of the power driven units including the drive circuit unit 8 and the optical unit 4 is stopped. That is to say, the detecting circuit 80 allows the image display device 100 to stop the power supply to the power driven unit (i.e., the predetermined driven unit) when the lever 71 is brought out of contact with the projection 51. In other words, when the falling-down detecting unit 7 detects the falling-down of the image display device 100, the falling-down detecting unit 7 allows the image display device 100 to stop the power supply to the power driven units (such as the drive circuit unit 8 and the optical unit 4). Consequently, the optical unit 4 cannot emit any laser light beam.

In the case where the image display device 100 falls down (the falling-down detecting unit 7 is turned at the predetermined angle or more), the hook 74 of the falling-down detecting unit 7 is locked to the lock 52 of the cover 5. The predetermined angle is, for example, 80°. In other words, when the image display device 100 falls down, the lock 52 is locked to the hook 74. As a consequence, even if a service person or the like return the falling-down image display device 100 to the original position to the normal installation state, the hook 74 of the falling-down detecting unit 7 remains locked to the lock 52.

As consequence, the lever 71 remains separated from the projection 51. That is to say, the lever 71 remains in the lever pressure zero state. In this manner, the power supply to the power source unit and all of the power driven units including the drive circuit unit 8 and the optical unit 4 remains stopped. Specifically, in the case where the falling-down detecting unit 7 detects the falling-down of the image display device 100 in the state in which no power is supplied to the power driven unit, no power remains supplied to the power driven unit in the image display device 100.

As described above, in the state in which the image display device 100 falls down so that the screen unit 3 is broken, the optical unit 4 does not emit any light beam, thereby preventing a user from receiving the light beam. In other words, in the case where the image display device 100 falls down so that the image display device 100 is broken, the light beam can be prevented from being emitted from the inside of the image display device 100. That is to say, high safety can be achieved in the image display device 100 in the present preferred embodiment.

As shown in part (b) in FIG. 2 and part (b) in FIG. 4, the cover 5 has a hole 53 that is used for unlocking the hook 74 from the lock 52 in the state in which the hook 74 is locked to the lock 52.

A service person installs the falling-down image display device 100 again, confirms safety without any breakage in the screen unit 3 or the main case 2, and then, he or she performs the following operation.

Specifically, the service person inserts a fine pin through the hole 53, to press the tip of the hook 74 so as to unlock the hook 74 from the lock 52. In this manner, the self weight of the weight 72 has the effect of returning the falling-down detecting unit 7 to the original position (see part (b) in FIG. 2).

In this case, the projection 51 presses the lever 71, and therefore, the power supply is restarted to the power source unit and all of the power driven units including the drive circuit unit 8 and the optical unit 4. With this configuration, high safety can be achieved.

As described above, in the present preferred embodiment, the single falling-down detecting unit 7 can detect both of the falling-down of the image display device 100 and the detachment of the cover 5 from the image display device 100. As a consequence, two detecting circuits or the like are not needed to detect the two kinds of states, and therefore, the falling-down detecting unit 7 can be implemented at a low cost. In other words, the image display device 100 can be implemented at as low cost. More particularly, the detection of the two kinds of states including the detection of the falling-down of the image display device 100 can be achieved at a low cost.

Moreover, the above-described Conventional Art C has experienced by a problem of a high cost since the acceleration detecting sensor, the microcomputer, the battery, and the like are needed to detect the falling-down of the image display device (i.e., the television). In contrast, the falling-down detecting unit 7 in the present preferred embodiment is actuated by utilizing the gravity, and therefore, the falling-down detecting unit 7 can be implemented at a low cost. In other words, the image display device 100 can be implemented at a low cost.

Additionally, in the case where the cover 5 is detached from the image display device 100 (i.e., the uncovered state), the power supply to all of the other power driven units including the drive circuit unit 8 and the optical unit 4 is stopped. As a consequence, no power is supplied to the power driven unit that a user may touch in the uncovered state, and thus, the safety can be secured.

Second Preferred Embodiment

Figure 5:
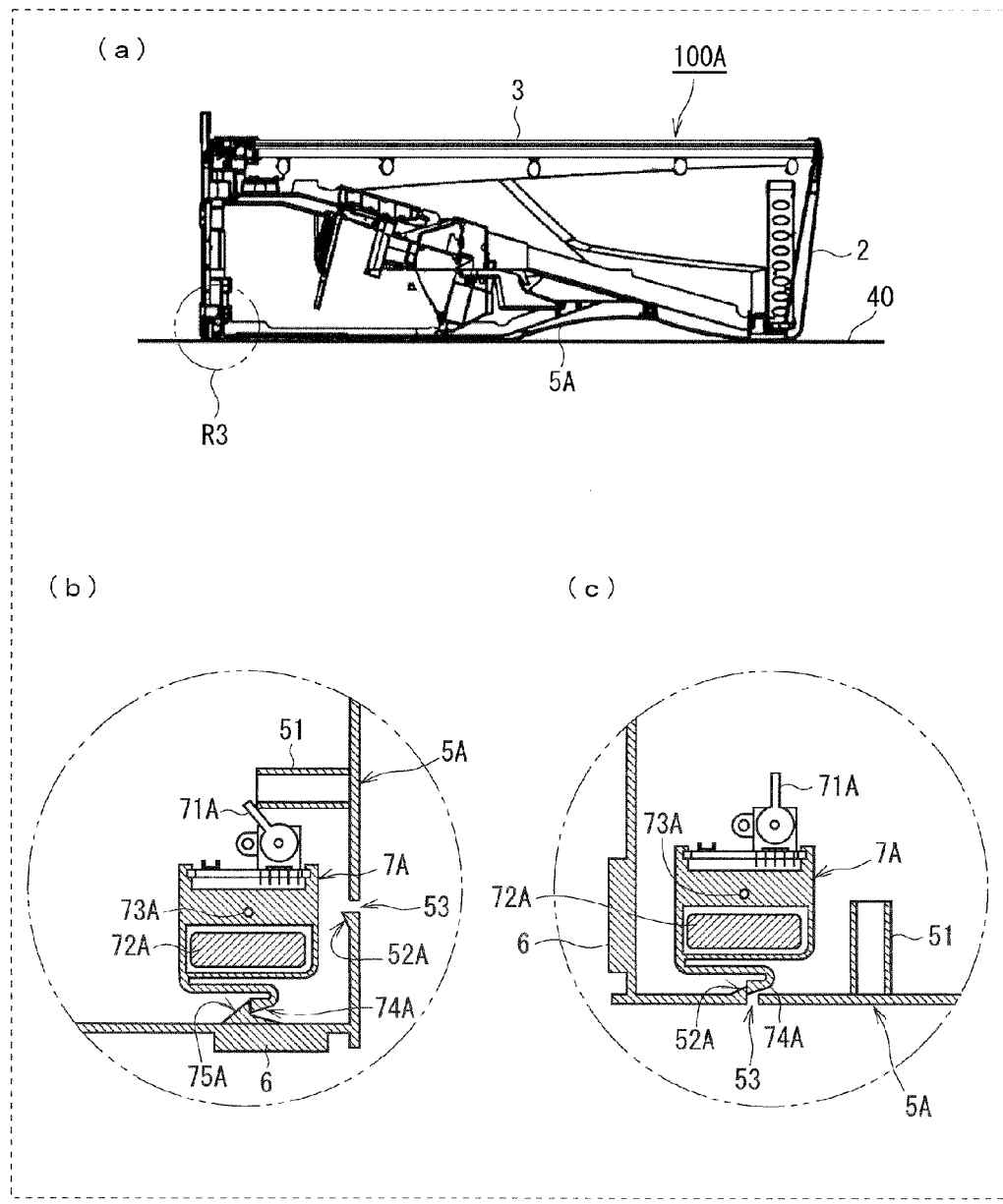
FIG. 5 is a view showing an image display device in a second preferred embodiment.

FIG. 5 is a cross-sectional view showing an image display device 100A in a second preferred embodiment. Part (a) in FIG. 5 is a cross-sectional view showing the image display device 100A that falls down on the back in contact with a floor 40 with a screen unit 3 thereof facing upward, as viewed sideways. Hereinafter, a state in which the image display device 100A falls down on the back may be referred to as a back falling state.

Part (b) in FIG. 5 is an enlarged view showing a region R3 in a state in which the image display device 100A shown in part (a) in FIG. 5 is normally installed. Part (c) in FIG. 5 is an enlarged view showing the region R3 in a state in which the image display device 100A falls down on the back. Here, the configurations shown in part (b) in FIG. 5 and part (c) in FIG. 5 are obtained by appropriately simplifying the configuration shown in part (b) in FIG. 2.

Hereinafter, a state in which the image display device 100A is normally installed such that the bottom (i.e., a bottom plate 6) of the image display device 100A faces downward may be referred to as a normal installation state, similar to the image display device 100 shown in part (a) in FIG. 2.

Referring to part (a) in FIG. 5 and part (b) in FIG. 5, the image display device 100A is different from the image display device 100 in replacing the cover 5 with a cover 5A, the falling-down detecting unit 7 with a falling-down detecting unit 7A, and the stopper 75 with a stopper 75A. The other constituent elements in the image display device 100A are the same as those in the image display device 100, and therefore, the detailed explanation will not be repeated.

The cover 5A is different from the cover 5 shown in part (b) in FIG. 2 in replacing the lock 52 with a lock 52A. The other constituent elements in the cover 5A are the same as those in the cover 5, and therefore, the detailed explanation will not be repeated.

Hereinafter, a state in which the cover 5A is detached from the image display device 100A may be referred also to as an uncovered state. In contrast, hereinafter, a state in which the cover 5A is attached to the image display device 100A may be referred to also as a covered state.

Figure 6:
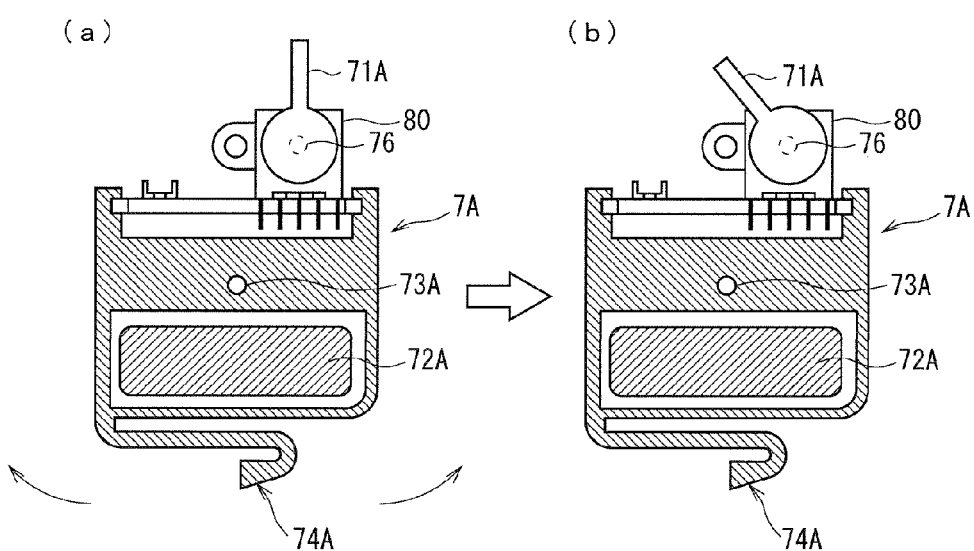
FIG. 6 is a cross-sectional view showing the configuration of a falling-down detecting unit.

FIG. 6 is cross-sectional view showing the configuration of the falling-down detecting unit 7A. Part (a) in FIG. 6 is a cross-sectional view showing the falling-down detecting unit 7A in the uncovered state. Part (b) in FIG. 6 is a cross-sectional view showing the falling-down detecting unit 7A in the covered state and the normal installation state.

Referring to part (a) in FIG. 6, the falling-down detecting unit 7A includes a lever 71A, a weight 72A, a hook 74A, and a detecting circuit 80. The lever 71A is fixed to the falling-down detecting unit 7A in such a manner as to be freely turned on an axis 76. Part (b) in FIG. 6 shows a state in which the lever 71A is turned with the application of pressure to the lever 71A.

The weight 72A is attached to the lower portion of the falling-down detecting unit 7A. The hook 74A has the same structure as that of the hook 74. Specifically, the hook 74A has an elastic structure in which the tip of the hook 74A is vertically moved when the pressure is applied to the tip of the hook 74A.

The detecting circuit 80 has the processing and function obtained by replacing the lever 71 with the lever 71A in the processing described in the first preferred embodiment. For example, the detecting circuit 80 is adapted to detect the state (such as a turn angle) of the lever 71A.

Similar to the falling-down detecting unit 7, the falling-down detecting unit 7A is fixed to the image display device 100A. Less specifically, the falling-down detecting unit 7A is fixed to the image display device 100A via a pin 73A in such a manner as to be freely turned on the pin 73A. Specifically, the falling-down detecting unit 7A is fixed to the image display device 100A in such a manner as to make a pendulous motion, that is, inclination by the effect of the weight 72A according to the inclination of the image display device 100A when the image display device 100A falls down.

The lever 71A is brought into contact with the projection 51 in the covered state and the normal installation state, and then, turns into the state shown in part (b) in FIG. 5 and part (b) in FIG. 6 under the pressure to be applied to the lever 71A.

In contrast, the pressure is not applied to the lever 71A in the uncovered state or the falling-down state, and therefore, the lever 71A turns into the state shown in part (c) in FIG. 5 and part (b) in FIG. 6. Hereinafter, a state in which no pressure is applied to the lever 71A is referred to also as a lever pressure zero state. The turn angle of the lever 71A in the lever pressure zero state is zero.

Upon the detection of the lever pressure zero state, the detecting circuit 80 controls the image display device 100A so as to stop the power supply to the power source (not shown), inside of the image display device 100A. As a consequence, the power is stopped from being supplied to all of the power driven units including the drive circuit unit 8 and the optical unit 4.

Incidentally, the bottom plate 6 has a stopper 75A. As shown in part (b) in FIG. 5, the stopper 75A is brought into contact with (or locked to) the hook 74A of the falling-down detecting unit 7A in the image display device 100A in the normal installation state, and then, the resultant resistance fixes the falling-down detecting unit 7A. That is to say, the stopper 75A is disposed so as to prevent the falling-down detecting unit 7A from being moved caused by a slight vibration in the image display device 100A in the normal installation state.

Normally, the image display devices in the first and second preferred embodiments are installed with the back sides thereof oriented toward the wall. Therefore, the image display device falls down forward caused by vibrations at the time of an earthquake with the screen unit 3 thereof facing downward.

Alternatively, it is assumed that the image display device is installed at a site apart from the wall or the image display device falls down in a packaged state. In this state, if the image display device falls down backward with the screen unit 3 thereof facing upward, an optical unit 4 and a drive circuit unit 8, neither shown, may be possibly broken.

However, the falling-down detecting unit 7A in the image display device 100A in the present preferred embodiment makes a pendulous motion on the pin 73A according to the inclination of the image display device 100A. In this manner, the lever 71A is separated from the projection 51, so that the power supply to all of the power driven units including of the drive circuit unit 8 and the optical unit 4 is stopped. Thus, the optical unit 4 does not emit any laser light beam.

In the case where the image display device 100A falls down backward thereof, the hook 74A of the falling-down detecting unit 7A is locked to the lock of the cover 5A. That is to say, when the image display device 100A falls down, the lock 52A is locked to the hook 74A.

In this manner, even if a service person or the like returns the falling-down image display device 100A to the original position in the normal installation state, the hook 74A of the falling-down detecting unit 7A remains locked to the lock 52A. Consequently, even if the image display device 100A falls down on the back thereof, the lever 771A and the projection 51 remain separated, and therefore, no power remains supplied to all of the power driven units including the drive circuit unit 8 and the optical unit 4.

Like in the first preferred embodiment, the cover 5A has a hole 53 that is used for unlocking the hook 74A from the lock 52A in the state in which the hook 74A is locked to the look 52A. Thus, the high safety can be achieved, similar to the first preferred embodiment.

As described above, in the present preferred embodiment, even if the image display device 100A falls down backward, the power supply to all of the power driven units including the drive circuit unit 8 and the optical unit 4 is stopped. Thus, it is possible to provide the image display device having the high safety.

Like in the first preferred embodiment, the single falling-down detecting unit 7A can detect both of the falling-down of the image display device 100A and the detachment of the cover 5A from the image display device 100A. As a consequence, the falling-down detecting unit 7A can be implemented at a low cost. In other words, the detection of the two kinds of states including the detection of the falling-down of the image display device 100A can be achieved at a low cost.

According to the present invention, the preferred embodiments may be freely combined with each other or may be appropriately modified or omitted within the scope of the present invention.

For example, although the detecting circuit 80 has been included in the falling-down detecting unit 7, the present invention is not limited to this. The detecting circuit 80 may be disposed outside of the falling-down detecting unit 7 as long as it can positionally detect the state of the lever 71.

The image display device according to the present invention can be used such that the detection of the two kinds of states including the detection of the falling-down of the image display device can be achieved at a low cost.

While the invention has been shown and described in detail, the foregoing description is in all aspects illustrative and not restrictive. It is therefore understood that numerous modifications and variations can be devised without departing from the scope of the invention.

What is claimed is:

1. An image display device comprising:
a cover that covers a predetermined driven unit to be driven by power supply; and
a falling-down detecting unit that detects falling-down of said image display device,
said falling-down detecting unit further detecting, based on force to be applied to said falling-down detecting unit in a state in which said cover is attached to said image display device, whether or not said cover is detached from said image display device.

2. The image display device according to claim 1, wherein said falling-down detecting unit includes to weight in a part thereof;
said falling-down detecting unit is fixed to said image display device in such a manner as to make a pendulous motion, that is, an inclination by the effect of said weight according to the inclination of said image display device when said image display device falls down; and
said falling-down detecting unit detects the falling-down of said image display device based on said pendulous motion.

3. The image display device according to claim 1, wherein said falling-down detecting unit allows said image display device to stop the power supply to said predetermined driven units when it detects the falling-down of said image display device.

4. The image display device according to claim 1, wherein said predetermined driven unit is a driven circuit unit to be electrically driven by the power supply and/or an optical unit for emitting a light beam by the power supply.

5. The image display device according to claim 1, wherein said falling-down detecting unit allows said image display device to keep the state in which no power is supplied to said predetermined driven unit when said falling-down detecting unit detects the falling-down of said image display device in a state in which no power is supplied to said predetermined driven unit.

6. The image display device according to claim 1, wherein said cover has a projection;

said falling-down detecting unit includes a lever that is brought into contact with said projection in a state in which said no display device is normally installed, and further, is brought out of contact with said projection in a state in which said image display device falls down; and said falling-down detecting unit includes a detecting circuit for detecting that said cover is attached to said image display device when said projection and said lever are brought into contact with each other whereas that said cover is detached from said image display device when said projection and said lever are brought out of contact with each other, said detecting circuit allowing said image display device to stop the power supply to said predetermined driven unit when said projection and said lever are brought out of contact with each other.

7. The image display device according to claim 1, wherein said falling-down detecting unit includes a hook having an elastic structure; and said cover has a lock that is locked to said hook when said image display device falls down.

8. The image display device according to claim 7, wherein said cover has a hole that is used for unlocking said hook from said lock in the state in which said hook and said lock are locked to each other.

* * * * *